May 11, 1926.

F. S. DUESENBERG 1,584,280

BRAKE

Filed Nov. 13, 1923    4 Sheets-Sheet 1

Inventor:
Frederick S. Duesenberg.
By Emery, Booth, Janney & Varney
Attys.

May 11, 1926.  
F. S. DUESENBERG  
BRAKE  
Filed Nov. 13, 1923  
1,584,280  
4 Sheets-Sheet 2
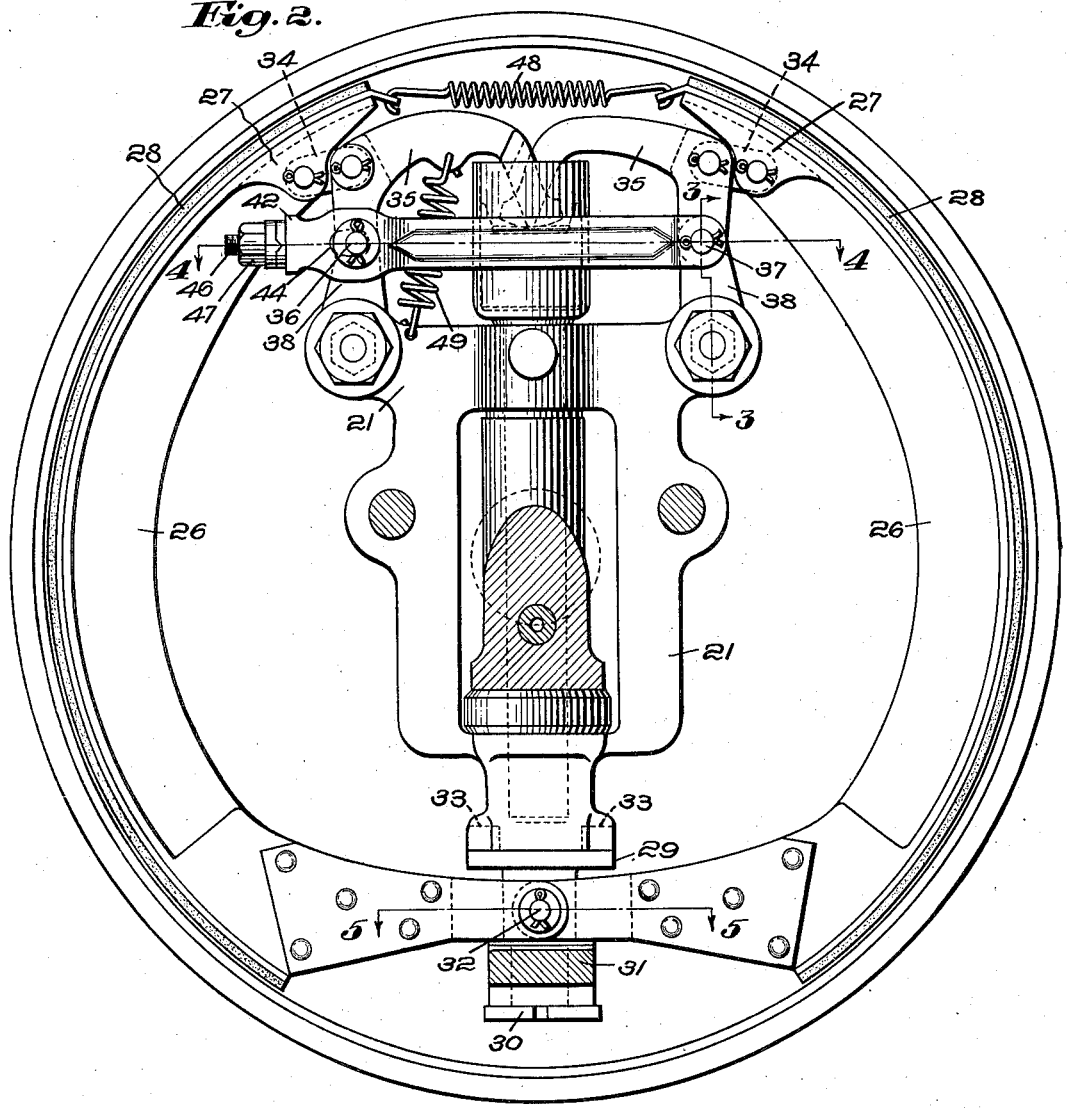
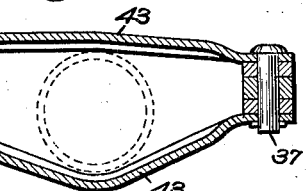
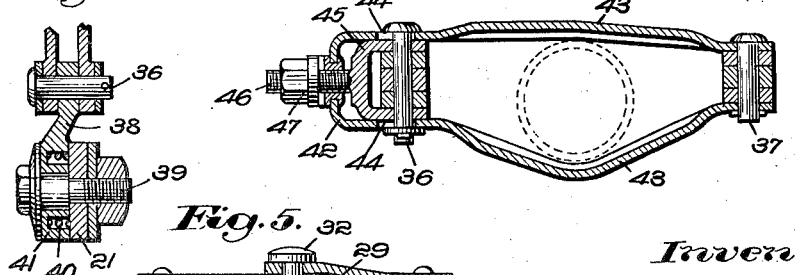
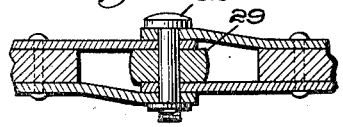
Inventor:
Frederick S. Duesenberg.
Attys.

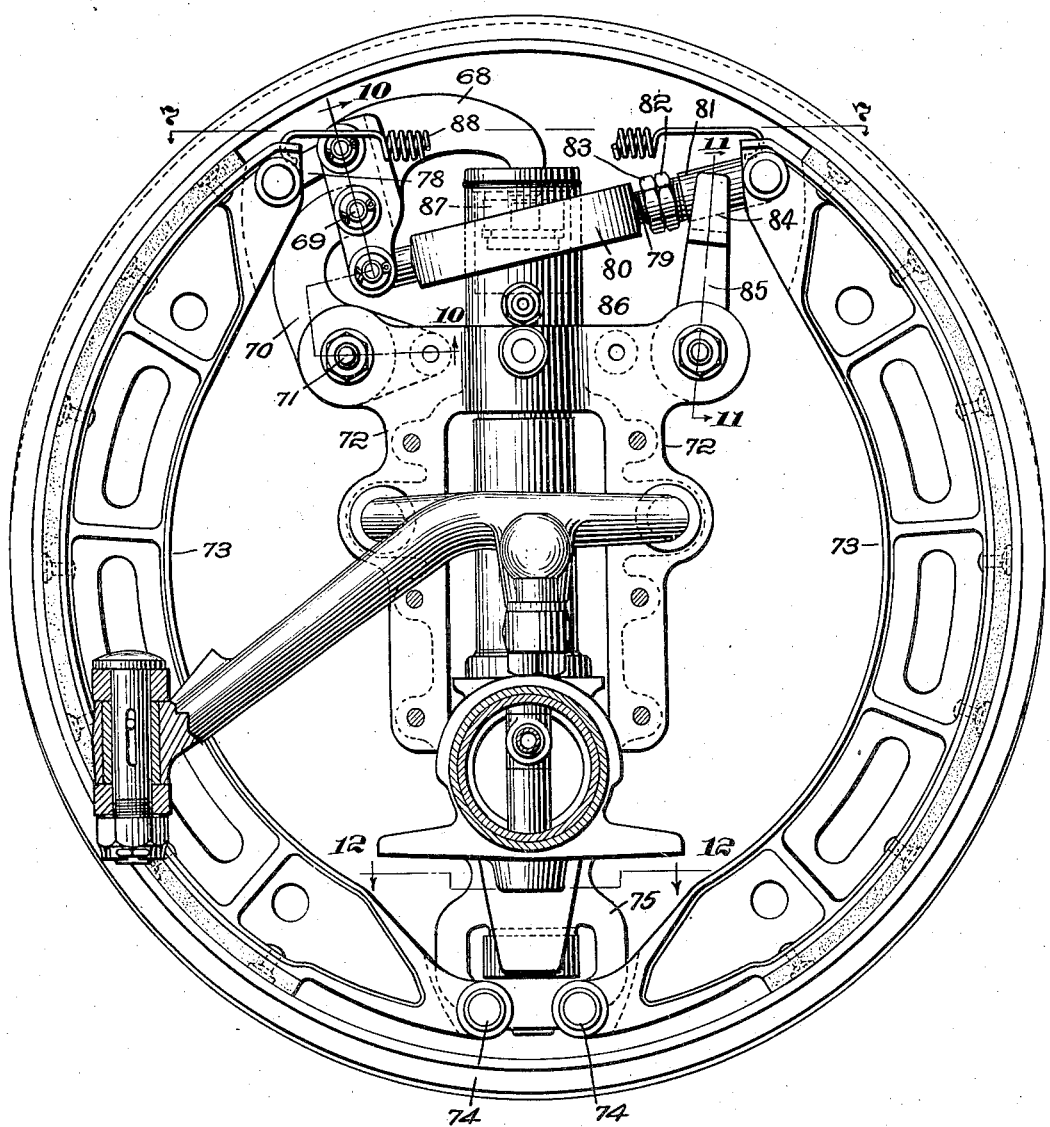

May 11, 1926. 1,584,280
F. S. DUESENBERG
BRAKE
Filed Nov. 13, 1923 4 Sheets-Sheet 4

Inventor:
Frederick S. Duesenberg.
by Emery, Booth, Janney & Varney
Attys

Patented May 11, 1926.

1,584,280

UNITED STATES PATENT OFFICE.

FREDERICK S. DUESENBERG, OF INDIANAPOLIS, INDIANA.

BRAKE.

Application filed November 13, 1923. Serial No. 674,467.

This invention relates to a novel and improved brake, having special utility in connection with motor cars some features having particular application to front wheel brakes, and others being equally applicable to rear wheel brakes.

The invention will be best understood by reference to the following description, when taken in connection with the accompanying drawings of two illustrative embodiments thereof, while its scope will be more particularly pointed out in the appended claims.

In the drawings:

Fig. 2 is a sectional view on line 2—2 of Fig. 1;

Fig. 3 is a sectional view on line 3—3 of Fig. 2;

Fig. 4 is a sectional view on line 4—4 of Fig. 2;

Fig. 5 is a sectional view on line 5—5 of Fig. 2;

Fig. 6 is a view, similar to Fig. 2, illustrating another and preferred embodiment of the invention;

Figure 1:
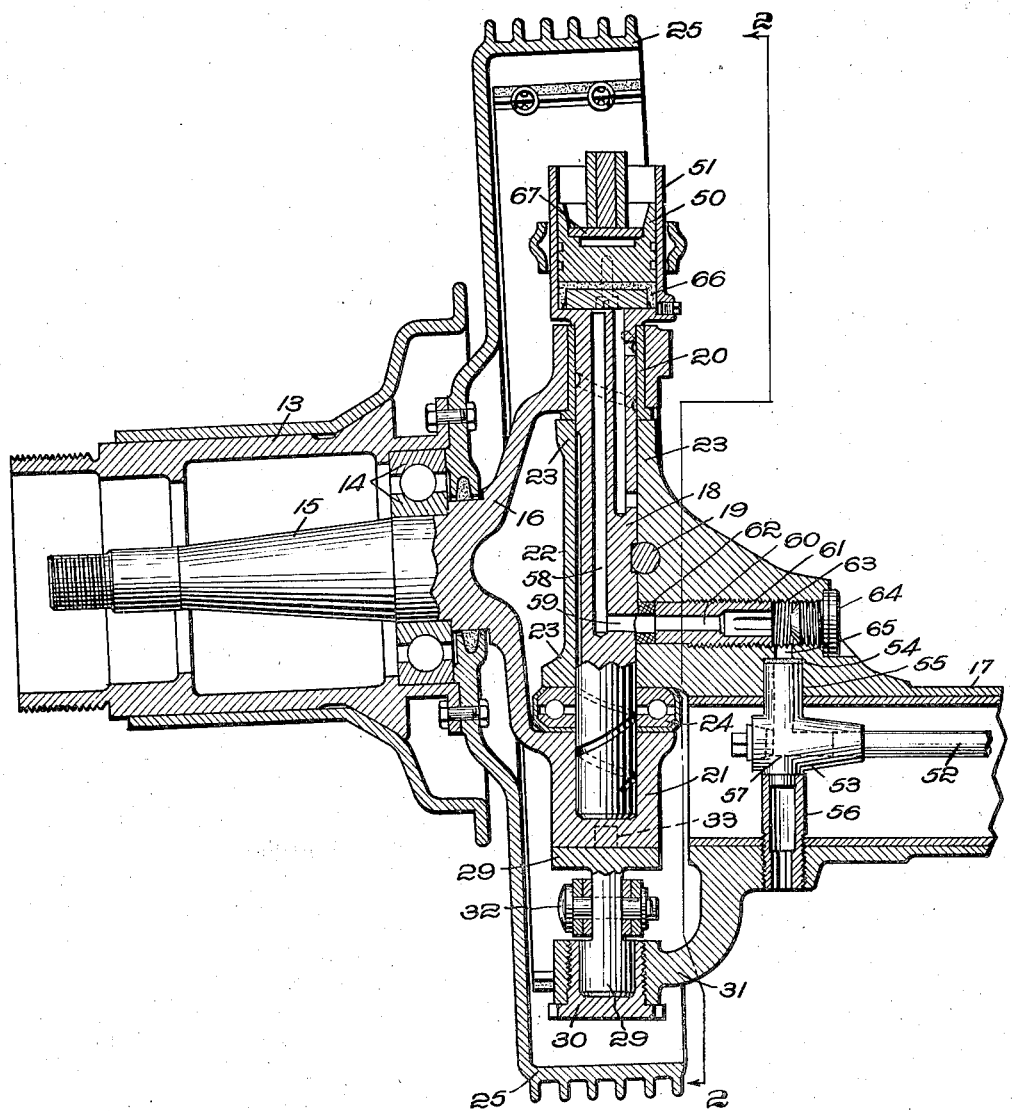
Fig. 1 is a vertical, sectional view of a front wheel brake exemplifying the invention, in a plane containing the axes of the axle, the steering pivot and the wheel spindle.

Referring to the drawings, and to the embodiment of the invention which is illustrated in Figs. 1 to 5, inclusive, there is shown a portion of a front wheel comprising a hub 13 (see Fig. 1) mounted to turn on bearings, one of which is shown at 14, on a sub-axle or spindle 15, herein formed as a part of a steering knuckle 16, the latter being suitably pivoted on an axle 17, as by the provision of a pivot 18, secured to the axle as by a pin 19. The steering knuckle in this embodiment is provided with upper and lower bearings 20 and 21, and has intermediate these bearings a recess 22, which receives a boss 23 presented by the end of the axle 17. In this example, this boss rests upon a ball thrust bearing 24, which contributes to the ease of steering the vehicle.

Suitably secured to the wheel hub is a brake drum 25, and enclosed by the latter is a brake-shoe or shoes, herein exemplified by a pair of brake shoes 26 (see Fig. 2), having terminals 27. These shoes are preferably provided with usual brake linings 28. Since the brake drum turns with the steering knuckle, the brake shoes, in order to remain at all times in cooperative relationship therewith, must also turn in unison with the steering knuckle. This is accomplished in this example by the provision of a brake-shoe support 29, which is mounted to turn in a bearing 30 in an ear 31 presented by the axle 17. The brake shoes are suitably pivoted on the support, as by a pivot pin 32, and the upper end of the support is coupled to the steering knuckle as by a coupling, herein comprising a pair of tongues 33, received in corresponding openings provided in the lower end of the steering knuckle. The support 29 turns in its bearing 30, thereby permitting the brake-shoes to turn with the brake-drum and steering knuckle, turning movement being enforced by the described coupling.

The brake-shoe actuating mechanism will now be described, reference being had at first to the upper portion of Fig. 2. The brake shoes are connected as by links 34 to lever means, in this example a pair of levers 35, fulcrumed on pivot pins 36 and 37, which have a floating support to equalize the force applied to the brake shoes. One convenient way of accomplishing this is to mount each of the pivot pins on a lever 38, which in turn (see Fig. 3) is mounted on a pivot presented by a stud 39 secured to the steering knuckle 21. If desired, the frictional resistance to turning movement of the levers 38 on their pivots may be increased by the provision of suitably arranged springs 40 one of which is shown in Fig. 3, each spring being seated in a recess 41 formed in its lever, and seated at its other end against the steering knuckle. The levers 38 are appropriately coupled together to cause them to move in unison, this being conveniently accomplished in the present example by the provision of a yoke designated generally by the numeral 42 in the form of a U-shaped link having a pair of arms 43 connecting the pivotal pins 36 and 37.

Initial adjustment and subsequent compensation for wear is conveniently accomplished by varying the distance between the pivotal pins 36 and 37, this being attained in the present example by providing the arms 43 with slots 44, in which the pivot pin 36 is adapted to slide toward and from the pivot pin 37. The pivot pin 36 is adjustable lengthwise of these slots by mounting the same in a yoke 45, having a threaded stem 46 extending through the yoke 42, and provided with an adjusting nut 47. By turning this nut in the proper direction, the distance between the pivot pins 36 and 37 may be varied as desired, thus determining the positions of the fulcra of the levers 35. By this means, the clearance between the brake shoes and the inner circumference of the brake drum may be adjusted.

The brake shoes may be normally held in their retracted positions by a suitably arranged spring or springs 48 (see Fig. 2), directly connecting the terminals 27 to which they are hooked, and I have further provided a spring 49 attached at its upper end to one of the levers 35, and at its lower end to the steering knuckle 21. These springs resist applying movement of the brake mechanism, and restore the latter to its initial position when the applying force is removed. This force herein is furnished by a plunger 50 (see Fig. 1) mounted to slide in a guide 51, arranged coaxially with reference to the steering pivot 18. The ends of the levers 35 simply rest upon the plunger. When, therefore, the plunger is raised, the levers are rocked on their fulcra, and the brake-shoes are brought into contact with the internal surface of the brake-drum. Since the plunger is coaxial with the steering pivot, it follows that turning movement of the steering knuckle is accompanied by swinging movement of the levers 35 about the axis of the pivot. It should here be noted that the pivot, and the plunger and its guide, are mounted within the brake-drum. This enables the axis of the steering pivot to be placed substantially in alignment with the point of contact of the wheel tire with the ground, thereby reducing frictional resistance to the steering movement of the wheels.

In the present example, the plunger is a piston, and its guide a cylinder, together constituting a fluid motor to which fluid may be supplied for the operation of the brake through a system of conduits now to be described, reference being had to Fig. 1. Within the axle 17 is a lengthwise pipe 52, which in practice leads from a master cylinder not shown herein. This pipe is attached to one branch of an elbow 53, whose other branch is seated against a packing washer 54 in a chamber 55 provided in the axle; it is held so seated by appropriate means, herein a hollow stud 56 threaded in an upward direction into the axle, and seated against a shoulder 57 presented by the elbow. By simply screwing the stud into place, the packing washer is held under compression, and leakage of fluid at that point is prevented.

Communication between the elbow and the brake cylinder 51 herein is afforded by providing the steering pivot 18 with a vertical passage 58, which communicates at its upper end with the cylinder, and at its lower end with a horizontal passage 59 extending laterally to the circumferential surface of the pivot, where it communicates with a passage 60 provided in a hollow stud 61 threaded into the axle in a horizontal direction, and seated at its inner end against a compressible washer 62 preferably formed of some suitable soft metal, such as lead. By screwing the stud into place against the washer, a non-leaking joint at this point is assured. The stud is screwed into a chamber 63, whose outer end is closed by a plug 64, and said chamber communicates by way of a short vertical passage 65 with the elbow 53.

The brake cylinder 51 is disposed exteriorly of and endwise with relation to the steering pivot 18 and herein is conveniently formed as an integral part of said pivot. The piston herein is provided with a cupped leather washer 66, and has a hardened steel plate 67, on which the brake levers 35 rest, and turn about the axis of the cylinder accompanying movement of the steering knuckle. When fluid, such as oil under pressure, is supplied through the described conduit system to the under side of the piston, the latter rises and rocks the levers upward and outward, thereby forcing the brake shoes in opposite directions against the internal surface of the brake-drum. When the pressure is removed, the brake levers and the piston are restored to their initial positions by the springs 48 and 49.

Figure 8:
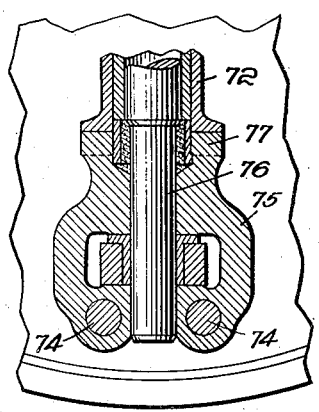
Fig. 8 is a vertical, sectional view in a plane containing the axis of the steering pivot, and looking in the same direction as Fig. 6.
Figure 9:
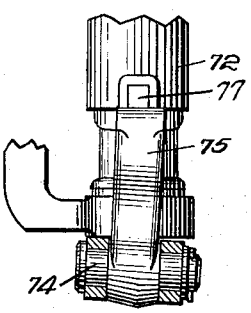
Fig. 9 is an elevation of some of the parts shown in Fig. 8, as viewed from the right hand side thereof.

If desired, instead of employing two brake-actuating levers, a single lever 68 may be employed (see Fig. 6), fulcrumed at 69 on a single floating support, such as a lever 70, mounted on a pivot comprising a stud 71 on a steering knuckle 72. Two brake-shoes 73 are mounted on pivots 74 on a swiveled support 75, which turns about a steering pivot 76, and is coupled to the steering knuckle (see Figs. 8 and 9) by a coupling comprising tongues 77 on the part 75 received in corresponding recesses in the steering knuckle 72, thereby causing the brake-shoes to swing to and fro with the steering knuckle when the latter turns about the axis of the steering pivot.

Figure 7:
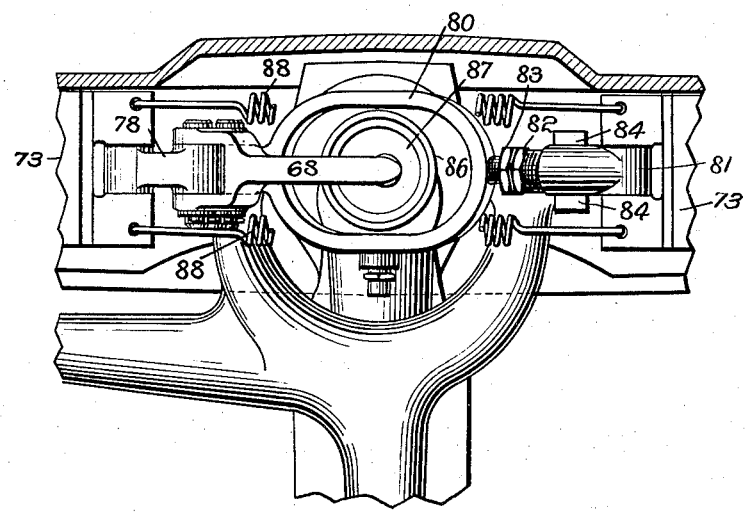
Fig. 7 is a sectional view on line 7—7 of Fig. 6.

Referring again to Fig. 6, the lever 68 is connected to the terminals of the brake-shoes 73 by links 78 and 79 at opposite sides, respectively, of the fulcrum 69, about which the lever rocks in operating the brake-shoes. It follows that rocking movement of the lever is accompanied by movement of the brake-shoes in opposite directions, respectively. Adjustment of the mechanism to compensate for wear is conveniently accomplished by making the link 79 in two parts 80 and 81, adjustably connected to each other as by a sleeve 82, which is externally threaded into the part 81 and internally threaded to receive the part 80, a lock-nut 83 being provided to preserve the adjustment. The part 81 is appropriately guided and held against lateral displacement by a guide 84 presented by an arm 85 mounted on the steering knuckle 72. The part 80 of the link is in the form of a yoke (see Fig. 7), to encompass a cylinder 86, which actuates the lever 68. Springs 88 restore the parts to their normal positions, following the application of the brake by upward movement of the piston.

Figure 10:
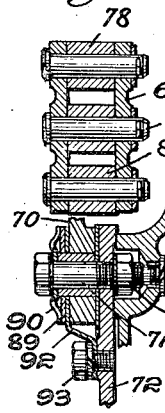
Fig. 10 is a sectional view on line 10—10 of Fig. 6.
Figure 11:
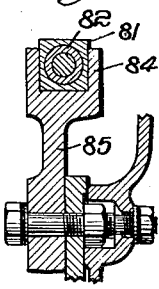
Fig. 11 is a sectional view on line 11—11 of Fig. 6.
Figure 12:
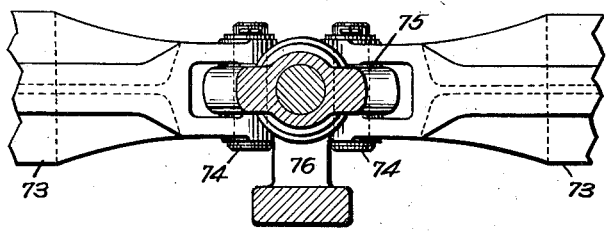
Fig. 12 is a sectional view on line 12—12 of Fig. 6.

By the provision of the floating support 70, the mechanism for the actuation of the brake-shoes is self-equalizing when initially installed, and subsequently when in use, thereby ensuring the application of both brake-shoes with equal pressure. In other words, the entire brake mechanism is self-centering with respect to the brake-drum. This position is normally maintained by a yielding, frictional resistance presented by a washer 89 (see Fig. 10), and a spring washer held in place by a nut 91 threaded onto the stud 71, securing the latter to the steering knuckle 72. The pressure of the spring washer 90 is communicated through the washer 89 to a plate 92, which in turn is pressed against the lever 70, and is held against rotation by a cap screw 93, threaded into the steering knuckle 72. By this means, the brake-actuating mechanism is enabled to center itself, and when centered, to remain in such position, held by ample frictional resistance preventing accidental movement.

This application is a continuation in part of my pending application for brake systems, Ser. No. 512,316, filed November 2nd, 1921, which has eventuated in the issuance of Patent No. 1,488,102.

Having thus described these embodiments of the invention, but without limiting myself thereto, what I claim and desire by Letters Patent to secure is:

1. In a vehicle, the combination of a wheel; a steering knuckle on which said wheel is mounted to rotate; a pivot about whose axis said steering knuckle turns; and brake mechanism comprising a drum carried by said wheel, brake shoe means within said drum, presenting terminals movable toward and from each other, lever means actuating said terminals, and a lever actuating piston and cylinder axially aligned with and disposed externally of said pivot and within said drum.

2. In a vehicle, the combination of a wheel; a steering knuckle on which said wheel is mounted to rotate; a pivot about whose axis said steering knuckle turns; and brake mechanism comprising a drum carried by said wheel, brake shoe means within said drum, presenting terminals movable toward and from each other, lever means actuating said terminals, and a lever actuating piston and cylinder axially aligned with and disposed externally of said steering knuckle and within said drum.

3. In a vehicle, the combination of a wheel; a steering knuckle on which said wheel is mounted to rotate; a pivot about whose axis said steering knuckle turns; and brake mechanism comprising a drum carried by said wheel, brake shoe means within said drum, presenting terminals movable toward and from each other, lever means actuating said terminals, and a lever actuating piston and cylinder axially aligned with and disposed externally of said pivot and said steering knuckle and within said drum.

4. In a vehicle, the combination of a wheel; a steering knuckle presenting a wheel spindle and a pivot bearing; a pivot received in said bearing and about which said steering knuckle turns; and brake mechanism comprising a drum carried by said wheel, brake shoe means within said drum, presenting terminals movable toward and from each other, lever means actuating said terminals, and means for actuating said lever means, said actuating means including a piston and cylinder disposed endwise of said pivot and externally of said bearing, said cylinder being supported by said pivot within said drum.

5. In a vehicle, the combination of a wheel; a steering knuckle presenting a wheel spindle and a pivot bearing; a pivot received in said bearing and about which said steering knuckle turns; and brake mechanism comprising a drum carried by said wheel, brake shoe means within said drum, presenting terminals movable toward and from each other, and terminal actuating means including a piston and cylinder disposed endwise of and outside of said pivot, said cylinder being supported by said pivot within said drum.

6. In a vehicle, the combination of a wheel; a steering knuckle presenting a wheel spindle and a pivot bearing; a pivot received in said bearing and about which said steering knuckle turns; and brake mechanism comprising a drum carried by said wheel, brake shoe means within said drum, presenting terminals movable toward and from each other, and terminal actuating means including a piston and cylinder disposed endwise of and outside of said pivot and said bearing, said cylinder being supported by said pivot within said drum.

7. In a vehicle, the combination of a wheel; a steering knuckle presenting a wheel spindle and a pivot bearing; a pivot received in said bearing and about which said steering knuckle turns; and brake mechanism comprising a drum carried by said wheel, brake shoe means within said drum, presenting terminals movable toward and from each other, and terminal actuating means including a piston and cylinder, the latter constituting a prolongation of said pivot beyond said bearing and within said drum.

8. In a vehicle, the combination of a wheel; a steering knuckle presenting a wheel spindle and a pivot bearing; a pivot received in said bearing and about which said steering knuckle turns; and brake mechanism comprising a drum carried by said wheel, brake shoe means within said drum, presenting terminals movable toward and from each other, and terminal actuating means including a piston and cylinder, the latter being larger in diameter than said pivot and supported by the latter within said drum.

9. In a vehicle, the combination of a wheel; a steering knuckle on which said wheel is mounted to rotate; a pivot about which said steering knuckle turns, said pivot presenting a conduit, and brake mechanism comprising a drum carried by said wheel, brake shoe means within said drum, presenting terminals movable toward and from each other, and terminal actuating means including a piston and cylinder, the latter being disposed endwise of said pivot and communicating with said conduit at a point beyond said pivot.

10. A brake mechanism comprising, in combination, a brake drum; brake shoe means presenting terminals; a support which holds said brake-shoe means against turning movement about the axis of said drum; lever means actuating said terminals; means mounted on said support and presenting a floating support for said lever means to enable the force applied to said terminals to be equalized; and an actuator for said lever means.

11. A brake mechanism comprising, in combination, a brake drum; brake shoe means presenting terminals; a support which holds said brake-shoe means against turning movement about the axis of said drum; lever means actuating said terminals; means mounted on said support and presenting a floating support for said lever means to enable the force applied to said terminals to be equalized; means of adjustment to enable said terminals to be adjusted with reference to said drum; and an actuator for said lever means.

12. A brake mechanism comprising, in combination, a brake drum; brake shoe means presenting terminals; a support which holds said brake-shoe means against turning movement about the axis of said drum; lever means actuating said terminals; means mounted on said support and presenting a floating support for said lever means to enable the force applied to said terminals to be equalized; means of adjustment carried by said floating support to enable said terminals to be adjusted with reference to said drum; and an actuator for said lever means.

13. A brake mechanism comprising, in combination, a brake drum; brake shoe means presenting terminals; a support which holds said brake-shoe means against turning movement about the axis of said drum; lever means actuating said terminals; means mounted on said support and presenting a floating support for said lever means to enable the force applied to said terminals to be equalized; means including a link connecting said terminals to enable said terminals to be adjusted with reference to said drum; and an actuator for said lever means.

14. A brake mechanism comprising, in combination, a brake drum; brake shoe means presenting terminals; a support which holds said brake-shoe means against turning movement about the axis of said drum; lever means actuating said terminals; other lever means mounted on said support and presenting a floating support for the first-mentioned lever means; and an actuator for the first-mentioned lever means.

15. A brake mechanism comprising, in combination, a brake drum; brake shoe means presenting terminals; a support which holds said brake-shoe means against turning movement about the axis of said drum; lever means actuating said terminals; means mounted on said support and presenting a floating support for said lever means to enable the force applied to said terminals to be equalized; resilient means presenting a yielding frictional resistance to movement of said floating support; and an actuator for said lever means.

16. A brake mechanism comprising, in combination, a brake drum; brake shoe means presenting terminals; a support which holds said brake-shoe means against turning movement about the axis of said drum; a floating support mounted on the first mentioned support; a lever fulcrumed on said floating support and connected with one of said terminals; and a link connecting said lever to the other of said terminals.

17. A brake mechanism comprising, in combination, a brake drum; brake shoe means presenting terminals; a support which holds said brake-shoe means against turning movement about the axis of said drum; a floating support mounted on the first mentioned support; a lever fulcrumed on said floating support and connected with one of said terminals; and a lengthwise adjustable link connecting said lever to the other of said terminals.

18. A brake mechanism comprising, in combination, a brake drum; brake shoe means presenting terminals; a support which holds said brake-shoe means against turning movement about the axis of said drum; a terminal operating lever operatively connected to one of said terminals; a link connecting said lever to the other of said terminals; and a floating support to which said lever is connected intermediate the connections of said lever with such terminal and said link, said floating support being mounted on the first-mentioned support.

In testimony whereof, I have signed my name to this specification.

FREDERICK S. DUESENBERG.